United States Patent
Molhoek et al.

(10) Patent No.: US 8,138,240 B2
(45) Date of Patent: Mar. 20, 2012

(54) COMPOSITION SUITABLE FOR A POWDER COATING COMPOSITION COMPRISING AT LEAST ONE RESIN AND AT LEAST ONE DISPERSANT

(75) Inventors: Leendert J. Molhoek, Limbricht (NL); Jurjen H. M. Bolks, Zwolle (NL); Jochum Beetsma, Zwolle (NL)

(73) Assignee: DSM IP Assets B.V., Heerlen (NL)

( * ) Notice: Subject to any disclaimer, the term of this patent is extended or adjusted under 35 U.S.C. 154(b) by 360 days.

(21) Appl. No.: 11/667,012

(22) PCT Filed: Dec. 8, 2005

(86) PCT No.: PCT/EP2005/013408
§ 371 (c)(1),
(2), (4) Date: Jul. 24, 2007

(87) PCT Pub. No.: WO2006/066764
PCT Pub. Date: Jun. 29, 2006

(65) Prior Publication Data
US 2008/0009583 A1    Jan. 10, 2008

(30) Foreign Application Priority Data
Dec. 24, 2004 (EP) ..................... 04078582

(51) Int. Cl.
C08J 3/20 (2006.01)
C08J 3/12 (2006.01)
C08G 63/60 (2006.01)
C08K 3/22 (2006.01)

(52) U.S. Cl. ........ 523/351; 523/406; 523/307; 525/934; 524/599; 524/904; 528/274; 528/403

(58) Field of Classification Search ............... 523/401, 523/406, 351; 525/934; 524/599, 904; 528/274, 528/403
See application file for complete search history.

(56) References Cited

U.S. PATENT DOCUMENTS

| | | | |
|---|---|---|---|
| 4,129,489 A | | 12/1978 | Christenson et al. |
| 4,148,776 A | | 4/1979 | Dunlop et al. |
| 5,646,213 A | | 7/1997 | Guo |
| 5,863,875 A | * | 1/1999 | Steckel .................. 508/551 |
| 5,898,064 A | * | 4/1999 | Harada et al. .......... 526/203 |
| 6,005,017 A | * | 12/1999 | Daly et al. ............. 522/20 |
| 6,524,694 B1 | | 2/2003 | Phillips |
| 2003/0176558 A1 | | 9/2003 | Care et al. |

FOREIGN PATENT DOCUMENTS

| | | |
|---|---|---|
| CN | 1073701 | 6/1993 |
| CN | 1223680 | 7/1999 |
| JP | 2004283763 A * | 10/2004 |

OTHER PUBLICATIONS

Misev, T.A., *Powder Coatings, Chemistry and Technology*, John Wiley & Sons, 1991, pp. 144-145.

* cited by examiner

*Primary Examiner* — Tae H Yoon
(74) *Attorney, Agent, or Firm* — Nixon & Vanderhye P.C.

(57) ABSTRACT

Composition suitable for a powder coating composition comprising at least one resin and at least one dispersant wherein the dispersant is added during the resin synthesis or while the resin leaves the reactor.

7 Claims, 1 Drawing Sheet

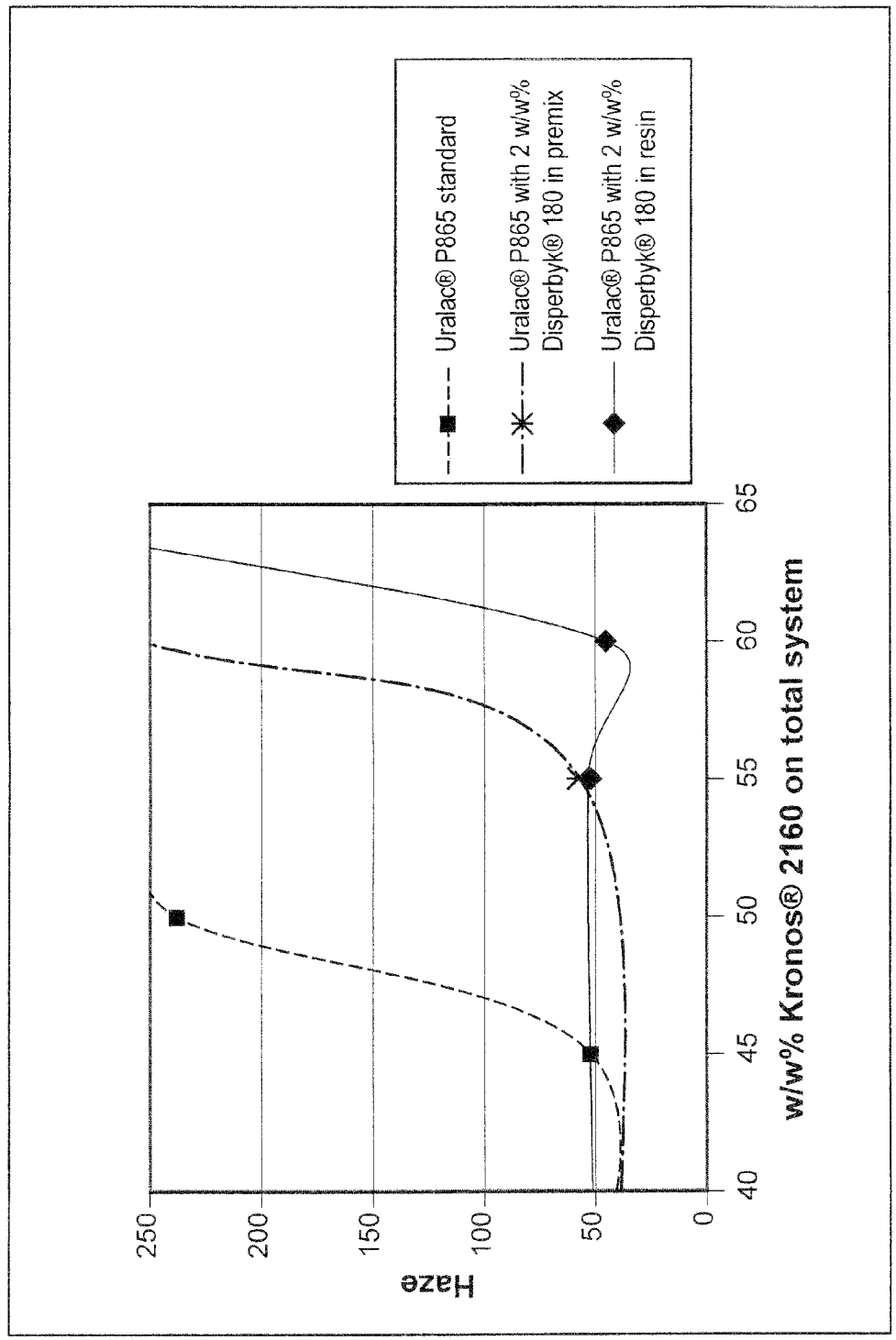

COMPOSITION SUITABLE FOR A POWDER COATING COMPOSITION COMPRISING AT LEAST ONE RESIN AND AT LEAST ONE DISPERSANT

This application is the US national phase of international application PCT/EP2005/013408 filed 8 Dec. 2005 which designated the U.S. and claims benefit of EP 04078582.6, dated 24 Dec. 2004, and is related to U.S. application Ser. No. 11/797,652 filed even date herewith now abandoned as a continuation-in-part of PCT/EP2005/013408, the entire content of each such application being hereby incorporated by reference.

FIELD

The invention relates to a composition suitable for a powder coating composition comprising at least one resin and at least one dispersant. The invention further relates to a process for preparing such a composition, a powder coating composition, the coating and a substrate coated with the powder coating.

BACKGROUND AND SUMMARY

Powder coating compositions almost always contain a certain amount of pigments to reach the aesthetic requirements. As known in the field of powder coating it is impossible to include high levels of pigments in the coating composition. A high level of pigment always gives rise to an unacceptable appearance of the final, cured, coating. For example flow, gloss, and haze deteriorate. Therefore it has never been possible to include large amounts of pigment into the coating composition. With high level is meant here levels of approximately more than 40-50 w/w % (amount of pigment in the coating composition).

In U.S. Pat. No. 6,669,984 a powder coating composition is described that comprises a powder-based binder, a pigment and a surface-active agent. The binder consists of the combination of a resin and a cross-linking agent. U.S. Pat. No. 6,669,984 seeks to improve the color strength without sacrificing too much on other physical properties. In a mixing and extrusion step the binder is combined with a pigment and a surface-active agent. By applying this procedure, U.S. Pat. No. 6,669,984 is able to incorporate up to 50% pigment in the coating mixture consisting of the binder, the pigment and the surface-active agent.

A disadvantage of U.S. Pat. No. 6,669,984 is that with higher levels of pigment the final coating has an unacceptable appearance. However as it is sometimes necessary or desirable to incorporate more than 50% pigment in the coating composition without deteriorating the haze, a solution to this problem had to be found. An example of the necessity of a higher than 50% pigment-loading is when only thin layers of the coating composition are applied, whereby it is still necessary to reach the desired and specified requirements such as for example high "hiding power".

It is an object of the present invention to overcome this disadvantage. This is reached by a composition suitable for a powder coating composition comprising at least one resin and at least one dispersant whereby the dispersant is added during the resin synthesis or while the resin leaves the reactor. With reactor is here and hereinafter meant the reactor wherein the resin is synthesized. It has surprisingly been found that a powder coating composition that comprises the composition according to the present invention shows no significant increase in the amount of haze when more than 50 w/w % pigment is added.

An additional advantage of the composition according to the invention is that the flow of a powder coating composition comprising the composition according to the invention is generally better than a powder coating composition known in the prior art. Further the gloss and processability of the powder coating composition are improved when the composition according to the invention is used.

BRIEF DESCRIPTION OF THE DRAWING

FIG. 1 is a graph showing the influence of the dispersant on the amount of pigment in relation to the haze of the final coating.

DETAILED DESCRIPTION

The composition according to the invention comprises at least one resin and at least one dispersant. The nature of the resin is not particularly critical; a wide variety of resins can be used in the composition. The nature of the resin in the composition suitable for a powder coating composition will practically be guided by the nature of the coating desired and its application. For example outdoor applications will probably make it necessary to use other resins than indoor applications. Examples of suitable resins are chosen from the list comprising polyester resin, urethane resin, epoxy resin, acrylic resin, phenolic resin, polyesteramide resin and combinations of any of them. The polyester resin can be either saturated or unsaturated. Preferably the resin is a polyester resin, an acrylic resin, a polyesteramide, an epoxy resin or a combination of any of them. Most preferably the resin is a polyester resin, an acrylic resin, a polyesteramide or a combination of any of them.

The resin will generally have some functional groups through which the resin can react with a crosslinker upon which a network will be formed. Examples of suitable functional groups are carboxyl-, hydroxyl-, epoxy-, amino groups and combinations of any of them. Preferably carboxyl- or hydroxyl groups are present in the resin.

The composition according to the invention comprises in addition to the resin at least one dispersant. Dispersants are sometimes also referred to as "dispersing agents". With dispersant is here and hereinafter meant an additive that increases the stability of a powder in another medium. With additive is here and hereinafter meant a substance that is generally added in a small quantity and that has a particular chemical or technological effect. The "other medium" can also be another powder as long as its chemical nature is different from the nature of the first powder. The powder can for example be a pigment powder, which needs to be dispersed in a powder resin as medium. The medium is the component that is present in the higher amount compared to the amount of the powder (amount on weight basis).

The nature of the dispersant is not particularly critical and its choice will mainly depend on the interaction with the other components in the composition. Suitable examples of dispersants are compounds that comprise both a "pigment-affinic" group and a "resin-affinic" group. Examples of the "pigment-affinic" group are phoshoric acid ester-groups and sulfonic acid-groups. With "pigment-affinic" group is meant a chemical group that due to its character has a higher affinity for the pigment compared to the resin. With "resin-affinic" group is meant a chemical group that due to its character has a higher affinity for the resin compared to the pigment.

Examples of the "resin-affinic" groups are polyester, acrylate or urethane chains. The amount of dispersant is generally at least 0.01 w/w % and generally at most 10 w/w % (based on the amount dispersant in the resin). The amount of dispersant is preferably at least 0.1 w/w % more preferably at least 0.3 w/w %. The amount of dispersant is preferably at most 5 w/w %, more preferably at most 3 w/w %, most preferably at most 1.5 w/w %. A preferred range is 0.1-5 w/w %, more preferably 0.3-3 w/w %.

The dispersant can be a solid or liquid at room temperature. Preferably the dispersant is a solid at room temperature.

The resin is a solid at room temperature. The glass temperature (Tg) of the resin lies at or above 20° C. Preferably the Tg lies above 35° C., more preferably above 45° C. The Tg is determined by differential scanning calorimetry (DSC) at a heating rate of 5° C/min.

The composition according to the invention comprising at least one resin and at least one dispersant is prepared by adding the dispersant during the resin synthesis or while the resin leaves the reactor. With "during the resin synthesis" is meant that the dispersant is added after the resin synthesis has started but before the resin leaves the synthesis reactor. Generally the resin will be partially or fully cooled down before it leaves the synthesis reactor. Preferably the resin is partially cooled down before leaving the reactor. The dispersant is preferably added to the resin while the resin is partly cooled down but when it is still in the reactor.

The composition prepared in this way has new and very advantageous properties which are best reflected by the properties of the final coating that can be obtained after curing a powder coating composition comprising the composition according to the invention. The coating so obtained from the powder coating composition comprising the composition according to the invention and at least one pigment, displays a much lower haze than a coating that is obtained after curing the same powder coating composition without any dispersant. The coating obtained from the powder coating composition comprising the composition according to the invention and at least one pigment, also displays a much lower haze than a coating that is obtained from a powder coating composition that is prepared differently, for example by mixing the binder, the additive and the pigment in an extruder or by using a pre-mixer together with an extruder, while leaving all other conditions of preparing the coating the same.

With haze is meant the cloudy or turbid aspect or appearance of an otherwise transparent specimen caused by light scattered from within the specimen or from its surfaces (according to ASTM D 883-00). Haze is determined with a Byk-Gardner Haze-Gloss apparatus, well known in the art.

The resin itself can be prepared in ways known to the man skilled in the art, see for example "Powder Coatings, Chemistry and Technology" by T.A.Misev, John Wiley and Sons, 1991, the whole book in general and Chapter 2 in particular, which is hereby incorporated by reference. The dispersant is either added during the resin synthesis or while the resin leaves the reactor. In the first situation where the dispersant is added while the resin is still in the reactor, the dispersant is advantageously added just before the resin leaves the reactor. With "just before the resin leaves the reactor" is meant the moment in time where the resin has already all pre-determined properties and is more or less waiting to leave the reactor. Preferably the dispersant is added during a time interval that is 10% of the reaction time, preceding the leaving of the reactor. Thus when the reaction takes 2 hours to complete the reaction until all pre-determined properties are reached, then in 12 minutes before leaving the reactor the dispersant is preferably added.

The other situation to add the dispersant to the resin is "while the resin leaves the reactor". This can be reached for example by using an in-line mixer, which is well known to the man skilled in the art of resin synthesis. In-line mixers are for example available through Sulzer Chemtech.

In case a mixture of resins is used, the dispersant can be added to one of the resins or to both of them separately, by a process according to the invention.

The composition according to the invention can advantageously be used in a powder coating composition. A powder coating composition generally comprises a resin, a crosslinker, a pigment and a dispersant. Additionally other components can be added to the powder coating composition, for example flow control agents, catalysts, fillers, light-stabilizers, biocides, and degassing agents.

With powder coating composition is here and hereinafter meant a solid composition that is suitable for application as a powder onto a substrate. With solid is here and hereinafter meant a compound that is solid at room temperature at atmospheric pressure. The glass temperature (Tg) of the powder coating composition lies at or above 20° C. Preferably the Tg lies above 35° C, more preferably above 45° C. The Tg is determined by differential scanning calorimetry (DSC) at a heating rate of 5° C./min.

The present invention also relates to a process for the preparation of a composition comprising at least one resin and at least one dispersant wherein the resin is prepared in a reactor and that the dispersant is added before the resin leaves the reactor or while leaving the reactor.

The present invention also relates to a powder coating composition comprising at least one resin and at least one crosslinker wherein at least one dispersant is present in the composition and that the dispersant is added during the resin synthesis or while the resin leaves the reactor. The powder coating composition according to the invention results after curing in a coating with improved properties in respect of haze, gloss and processability compared to a powder coating composition wherein the dispersant is added to the resin at another point in time. The powder coating composition according to the present invention preferably comprises at least one pigment.

The present invention also relates to a coating obtained by crosslinking the powder coating composition comprising at least one resin and at least one crosslinker wherein at least one dispersant is present in the composition and that the dispersant is added during the resin synthesis or while the resin leaves the reactor. The present invention also relates to a substrate fully or partly coated with a powder coating composition comprising at least one resin and at least one crosslinker wherein at least one dispersant is present in the composition and that the dispersant is added during the resin synthesis or while the resin leaves the reactor.

The crosslinker present in the powder coating composition is not particularly critical. The nature of the crosslinker is determined by the nature of the functional groups in the resin. The functional groups on the crosslinker must be able to react with the functional groups in the resin. Examples of crosslinkers are epoxy resins, polyamines, isocyanates, aminoresins, polycarboxylic acids, acid anhydrides, polyphenols, Primid®-like compounds and combinations of any of them.

Depending on the nature of the functional groups in the resin, the crosslinker will be chosen so as to react with the functional groups of the resin. The composition comprising at least the resin and the crosslinker will be cured. This curing process is well known to the man skilled in the art of making coatings. Examples of curing processes are thermal curing, curing with electromagnetic radiation, such as for example UV- or electron beam curing. Depending on the nature of the functional groups it is also possible to use two (dual-cure) or more types of curing processes.

The pigment present in the powder coating composition can be of an inorganic or organic nature. With pigment is meant here and hereinafter a substance consisting of particles, which is practically insoluble in the binder and is used as a colorant (DIN 55943). A colorant is a color-imparting substance. With binder is meant the combination of resin and crosslinker. Pigments suitable for use in the coating composition according to the invention and in the powder coating composition are for example white pigments, coloured pigments, black pigments, special effect pigments and fluorescent pigments. Generally the pigment can be present in a coating composition and more specifically in a powder coating composition in an amount of 1-50 w/w %. However the pigment can be present in a powder coating composition comprising the composition according to the invention in even higher amounts, for example up to 90 w/w/%, preferably between 50 and 85 w/w %, more preferably above 60 w/w % however preferably lower than 80 w/w %.

The present invention also relates to a powder coating composition comprising at least one resin, at least one crosslinker, at least one pigment and at least one dispersant, wherein the powder coating composition after curing has a haze lower than the same composition in the absence of any dispersant. Preferably the powder coating composition has, after curing, a haze that is 25% lower than the haze of the same cured powder coating composition in the absence of any dispersant. The lower haze obtainable after curing a powder coating composition according to the invention is reached at both high and low levels of pigment. However it is advantageously reached with a composition containing more than 40% (w/w) of pigment. Preferably with more than 50 w/w %, more preferably between 50 and 85 w/w %, even more preferably above 60 w/w %, however preferably lower than 80 w/w %.

The present invention also relates to a substrate fully or partly coated with a powder coating composition comprising at least one resin, at least one crosslinker, at least one pigment and at least one dispersant, wherein the powder coating composition after curing has a haze lower than the same composition in the absence of any dispersant.

The present invention also relates to a coating obtained after curing a powder coating composition comprising at least one resin, at least one crosslinker, at least one pigment and at least one dispersant, wherein the coating has a haze lower than the coating obtained after curing the same powder coating composition in the absence of any dispersant.

The influence of the moment of addition of the dispersant to the resin and thus of the invention, is for example represented in FIG. 1. In the graph of FIG. 1 it is shown that the parameter "haze" increases sharply after a certain value of the pigment loading (determined as weight pigment per weight coating composition). It can be seen from the graph of FIG. 1 that when no dispersant is added at all (represented by the curve labeled "Uralac® P865 standard"); the sharp increase in the haze-value occurs at approximately 45 w/w % (Uralac® P865 is a commercially available carboxyl-functional polyester sold by DSM Coating Resins, the Netherlands). Adding a commercially available dispersant (Disperbyk® 180, sold by BYK Chemie International) in the pre-mix results in a shift of the sharp increase towards approximately 49 w/w %. With "in the pre-mix" is referred to the moment when the dispersant is added, that is, the dispersant is added together with the other components that make up the coating composition, including the resin, on an extruder. Thus the dispersant is added only at a moment when the resin has already long left the resin synthesis reactor. When exactly the same dispersant is added in exactly the same amount but at the moment when the resin is synthesized, the sharp increase in haze is shifted upwards to higher pigment-loadings.

The invention will further be elucidated by the following, non-limiting examples.

EXAMPLES

Preparation of the Resin Composition

For the preparation of the resin composition, first polyester resins were synthesized. Uralac® P 865 is a carboxyl functional polyester, available from DSM Coating Resins, with acid value range AV=33-37 mg KOH/g, Tg=56° C. Uralac® P 4050 is a carboxyl functional polyester, available from DSM Coating Resins, with acid value range AV=68-76 mg KOH/g, Tg=58° C. The acid value is the amount of KOH that is necessary to neutralize the acidic constituents in 1 gram of resin. Uralac® P 1580 is a hydroxyl functional polyester, available from DSM Coating Resins, with hydroxy value range (OHV)=75-95 mg KOH/g, acid value is maximal 10 mg KOH/g, Tg=51° C. The hydroxyl value is calculated from the delta value (DV) and the acid value (AV). The delta value is the difference between the hydroxyl value and the acid value of a resin, expressed in mg KOH/g resin. The hydroxyl groups are acetylated with a known amount of acetic anhydride. The excess anhydride is hydrolyzed during a pre-dose of titration solution. The acetic acid formed is titrated with aqueous potassium hydroxide solution, together with the acid groups. The difference between blanc and sample determines the delta value (DV).

The polyester resins were synthesized by direct esterification at a temperature range of between 220° C. and 270° C. After synthesis, the polyester resins were each split into two parts, being further processed into resins A, B (Uralac® P 865); C, D (Uralac® P 4050) and E, F (Uralac® P 1580) respectively.

Resin A

An unmodified polyester resin Uralac® P 865 was cooled down in the synthesis reactor to a temperature of 180° C. Thereafter the resin left the reactor and was further cooled down to room temperature.

Resin B

At the end of the polyester resin synthesis of Uralac® P 865, the resin was allowed to cool down to a temperature of 180° C., while still being in the synthesis reactor. After reaching 180° C., 2 w/w % (amount dispersant in resin) of Disperbyke® 180 (Byk Chemie International) was added to the Uralac® P 865, while being in the reactor. The composition was stirred for 15 minutes at 180° C. Thereafter the composition left the reactor and was further cooled down to room temperature.

Resin C

An unmodified polyester resin Uralac® P 4050 was cooled down in the synthesis reactor to a temperature of 180° C. Thereafter the resin left the reactor and was further cooled down to room temperature.

Resin D

At the end of the polyester resin synthesis of Uralac® P 4050, the resin was allowed to cool down to a temperature of 180° C., while still being in the synthesis reactor. After reaching 180° C., 2 w/w % (amount dispersant in resin) of Disperbyk® 180 (Byk Chemie International) was added to Uralac® P 4050. The composition was stirred for 15 minutes at 180° C. Thereafter the composition left the reactor and was further cooled down to room temperature.

Thereafter the composition left the reactor and was further cooled down to room temperature Examples I, II, III, IV and Comparative Experiment A1, A2, B1, B2, C1, C2, D1, and D2

White pigmented powder coating compositions containing the following ingredients were formulated as described in Table 1, and 2 (the amounts are given in parts by weight). In the Comparative Experiments indicated with an index "1", no dispersant is added at all. In the Comparative Experiments indicated with an index "2", the dispersant is added separately in an pre-mixer together with the other components (this will also be referred to as "external dispersant"). Examples according to the invention will also be referred to as "internal dispersant".

TABLE 1

|  | Comp. Exp. A-1; no dispersant | Comp. Exp. A-2; external dispersant | Example I; internal dispersant | Comp. Exp. B-1; no dispersant | Comp. Exp. B-2; external dispersant | Example II; internal dispersant |
|---|---|---|---|---|---|---|
| Resin A | 190 | 190 |  | 133 | 133 |  |
| Resin B |  |  | 190 |  |  | 133 |
| Primid ® XL-552; crosslinker | 10 | 10 | 10 | 7 | 7 | 7 |
| Disperbyk ® 180; dispersant |  | 3.8 |  |  | 2.66 |  |
| Kronos ® 2160; white pigment | 100 | 100 | 100 | 168 | 168 | 168 |
| Resiflow ® PV 5; flow additive | 3 | 3 | 3 | 3.08 | 3.08 | 3.08 |
| Benzoin; degassing agent | 0.833 | 0.833 | 0.833 | 0.56 | 0.56 | 0.56 |

TABLE 2

|  | Comp. Exp. C-1; no dispersant | Comp. Exp. C-2; external dispersant | Example III; internal dispersant | Comp. Exp. D-1; no dispersant | Comp. Exp. D-2; external dispersant | Example IV; internal dispersant |
|---|---|---|---|---|---|---|
| Resin C | 102 | 102 |  | 71.4 | 71.4 |  |
| Resin D |  |  | 102 |  |  | 71.4 |
| Araldite ® GT 7004 | 98 | 98 | 98 | 68.6 | 68.6 | 68.6 |
| Disperbyk ® 180 |  | 2.04 |  |  | 1.43 |  |
| Kronos ® 2160 | 100 | 100 | 100 | 168 | 168 | 168 |
| Resiflow ® PV 5 | 3 | 3 | 3 | 3.08 | 3.08 | 3.08 |
| Benzoin | 1.5 | 1.5 | 1.5 | 1.05 | 1.05 | 1.05 |

Resin E

An unmodified polyester resin Uralac® P 1580 was cooled down in the synthesis reactor to a temperature of 180° C. Thereafter the resin left the reactor and was further cooled down to room temperature.

Resin F

At the end of the polyester resin synthesis of Uralac® P 1580, the resin was allowed to cool down to a temperature of 180° C., while still being in the synthesis reactor. After reaching 180° C., 5 w/w % (amount dispersant in resin) of Disperbyk® 180 (Byk Chemie International) was added to Uralac® P 1580. The composition was stirred for 15 minutes at 180° C.

Primid is a registered trademark of EMS Chemie

Disperbyk is a registered trademark of BYK Chemie International

Kronos is a registered trademark of Kronos Europe

Resiflow is a registered trademark of Worlee-chemie GmbH

Araldite is a registered trademark of Huntsman advanced materials (europe)

The ingredients were mixed in a pre-mixer (Kinematica Blender Microtron MB 550), homogenised and extruded in a double screw Prism extruder (Prism TSE 16 PC (200 RPM, 120° C.)). The extrudate was milled (Retsch ZM 100 (18000 RPM)) and sieved (Retsch vibro (90 μm)) to a powder with particle size less than 90μ. The powders were sprayed electrostatically on an aluminium substrate (AL-46). The coated substrates were cured for 10 minutes at 180° C. The properties of the resulting coated substrates are reported in Table 3 and 4.

TABLE 3

|  | Comp. Exp. A-1; no dispersant | Comp. Exp. A-2; external dispersant | Example I; internal dispersant | Comp. Exp. B-1; no dispersant | Comp. Exp. B-2; external dispersant | Example II; internal dispersant |
|---|---|---|---|---|---|---|
| Haze | 32 | 74 | 21 | 291 | 189 | 45 |
| Gloss 20° | 88 | 87 | 90 | 62 | 70 | 78 |
| Gloss 60° | 96 | 97 | 96 | 89 | 90 | 87 |
| Flow | 6 | 5 | 7.5 | 2 | 2 | 6 |
| Impact 60ip/50 μm initial | pass | 2 cracks | pass | pass | pass | pass |
| Gel time at 200° C., sec | 150 | 177 | 180 | 130 | 140 | 160 |
| Heat stability (b*) |  |  |  |  |  |  |
| b* initial | 0.5 | 0.5 | 0.3 | 0.6 | 1 | 0.6 |
| b* 60'220° C. | 0.9 | 1.5 | 1 | 1 | 4 | 1.1 |
| db* 60'220° C. | 0.5 | 0.9 | 0.7 | 0.4 | 3 | 0.5 |
| b* 10'240° C. | 0.7 | 2 | 0.9 | 1.1 | 2.4 | 1.3 |
| db* 10'240° C. | 0.3 | 1.4 | 0.6 | 0.5 | 1.3 | 0.7 |

TABLE 4

|  | Comp. Exp. C-1; no dispersant | Comp. Exp. C-2; external dispersant | Example III; internal dispersant | Comp. Exp. D-1; no dispersant | Comp. Exp. D-2; external dispersant | Example IV; internal dispersant |
|---|---|---|---|---|---|---|
| Haze[1] | 64 | 69 | 73 | 513 | 479 | 155 |
| Gloss 20° | 93 | 90 | 93 | 44 | 18 | 77 |
| Gloss 60° | 101 | 98 | 99 | 88 | 63 | 93 |
| Flow[2] | 7 | 6 | 7 | 1 | 1 | 3 |
| Impact[3] 60ip/50 μm after 1 day | pass | pass | pass | fail | Fail | Pass |
| Gel time at 200° C., sec[4] | 135 | 90 | 92 | 190 | 145 | 115 |
| Heat stability (b*)[5] |  |  |  |  |  |  |
| b* initial | 0.4 | 1 | 0.8 | 0.7 | 1.5 | 0.3 |
| b* 60'220° C. | 0.8 | 1.4 | 1.1 | 1.1 | 3.1 | 0.7 |
| db* 60'220° C. | 0.4 | 0.4 | 0.3 | 0.4 | 1.6 | 0.4 |
| b* 10'240° C. | 1.2 | 1.6 | 1.6 | 1.3 | 3.2 | 0.8 |
| db* 10'240° C. | 0.8 | 0.6 | 0.8 | 0.6 | 1.7 | 0.5 |

[1]Haze and Gloss properties of the powder coating are measured with a Byk Gardner haze-gloss meter at a layer thickness of 60 μm. A low value for the haze is preferable and a high value for the gloss is preferable.
[2]Flow is determined visually compared to PCI-panels and is rated with a value between 1-10, with 10 = best
[3]ASTM D2794
[4]DIN 55 990
[5]The color properties of the powder coating can be expressed in a b*-value, measured with a Dr Lange Micro Color Meter measured at a layer thickness of 60 μm according to ISO 7724. The closer the b*-value is to zero, the better.

The results show that the addition of a pigment-dispersing agent in the resin synthesis reactor (example I-IV) gives better properties than no addition or the addition of a pigment-dispersing agent in the premix of the powder coating (Comparative Experiments). With the addition of a pigment-dispersing agent in the resin synthesis reactor, a coating composition can be obtained with properties not yet known in the art, which make it possible to apply higher pigment loadings while coating appearance is not affected.

The same kind of experiments as described above were also performed with a hydroxyl functional polyester (Uralac® P 1580), whose preparation is described above.

Examples V and VI and

Comparative Experiment E1, E2, F1 and F2

White pigmented powder coating compositions containing the following ingredients were formulated as described in Table 5 (the amounts are given in parts by weight).

TABLE 5

| | Comp. Exp. E-1; no dispersant | Comp. Exp. E-2; external dispersant | Example IV; internal dispersant | Comp. Exp. F-1; no dispersant | Comp. Exp. F-2 external dispersant | Example VI; internal dispersant |
|---|---|---|---|---|---|---|
| Resin E | 142 | 142 | | 85 | 85 | |
| Resin F | | | 142 | | | 85 |
| Vestagon ® B 1530; crosslinker | 58 | 58 | 58 | 36.43 | 36.43 | 36.43 |
| Disperbyk ® 180 | | 2.04 | | | 4.3 | |
| Kronos ® 2160 | 100 | 100 | 100 | 188.5 | 188.5 | 188.5 |
| Resiflow ® PV 5 | 3 | 3 | 3 | 3.10 | 3.10 | 3.10 |
| Benzoin | 1.5 | 1.5 | 1.5 | 0.91 | 0.91 | 0.91 |

Vestagon is a registered trademark from Degussa AG

The coated substrates were prepared in the same manner as described above. The properties of the resulting coated substrates are reported in Table 6.

TABLE 6

| | Comp. Exp. E-1; no dispersant | Comp. Exp. E-2; external dispersant | Example IV; internal dispersant | Comp. Exp. F-1; no dispersant | Comp. Exp. F-2; external dispersant | Example VI; internal dispersant |
|---|---|---|---|---|---|---|
| Haze[1] | 76 | 155 | 76 | 145 | 255 | 140 |
| Gloss 20° | 76 | 71 | 76 | 60 | 50 | 60 |
| Gloss 60° | 89 | 90 | 90 | 82 | 81 | 83 |
| Flow[2] | 8 | 3 | 9 | 3 | 2 | 5.5 |

The results show that the addition of a pigment-dispersing agent in the resin synthesis reactor improves the flow of the final coating composition without deteriorating the haze and gloss. Comparing this to the situation where the dispersant is added only after the synthesis or not even at all, it is clear that the overall result is improved, while it is possible to incorporate high levels of pigment. Thus the composition obtained according to the process has properties not yet known in the art, which make it possible to use high pigment loadings while retaining or improving the other properties.

The invention claimed is:

1. Process for the preparation of a powder coating composition having a glass transition temperature (Tg) at or above 20° C. and comprising (i) a resin having a Tg above 35° C. and functional groups through which the resin can react with a crosslinker, (ii) a crosslinker having functional groups which are able to react with the functional groups of the resin, (iii) a pigment powder, and (iv) a dispersant for dispersing the pigment powder in the powder coating composition, wherein the process comprises the steps of:
   (a) preparing the resin in a reactor;
   (b) adding the dispersant to the resin when the resin is in a liquid state at a temperature above the glass transition temperature (Tg) of the resin and at or below 270° C. just before the resin leaves the reactor or while the resin leaves the reactor in an amount of at least 0.01 to at most 10 w/w% based on the weight of dispersant in the resin to obtain a mixture of the resin and the dispersant;
   (c) solidifying the mixture of step (b);
   (d) mixing the pigment powder in an amount of more than 40 w/w% based on the weight of the powder coating composition and the crosslinker with the solidified mixture of step (c) to obtain a pigment-containing mixture;
   (e) homogenizing the pigment-containing mixture of step (d) to obtain a homogenized mixture; and
   (f) milling and sieving the homogenized mixture to obtain the powder coating composition.

2. Process according to claim 1, wherein the resin is selected from the group consisting of polyester resin, acrylic resin, polyesteramide, epoxy resin and combinations thereof.

3. Process according to claim 1, wherein the Tg of the resin is above 45° C.

4. Process for the preparation of a coated substrate comprising the steps of:
   preparing a powder coating composition according to claim 1; and
   fully or partially coating a substrate with the powder coating composition.

5. Process according to claim 4, further comprising the step of curing the powder coating composition.

6. Process according to claim 1, wherein step (d) comprises mixing the pigment powder with the solidified mixture of step (c) in an amount of more than 50 w/w% based on the weight of the powder coating composition.

7. Process according to claim 1, wherein step (d) comprises mixing the pigment powder with the solidified mixture of step (c) in an amount between 50 and 85 w/w% based on the weight of the powder coating composition.

* * * * *